Aug. 13, 1957   N. C. PRICE ET AL   2,802,333
VARIABLE AREA AND DIRECTION CHANGING PROPULSIVE NOZZLE
Filed Dec. 28, 1951   2 Sheets-Sheet 2

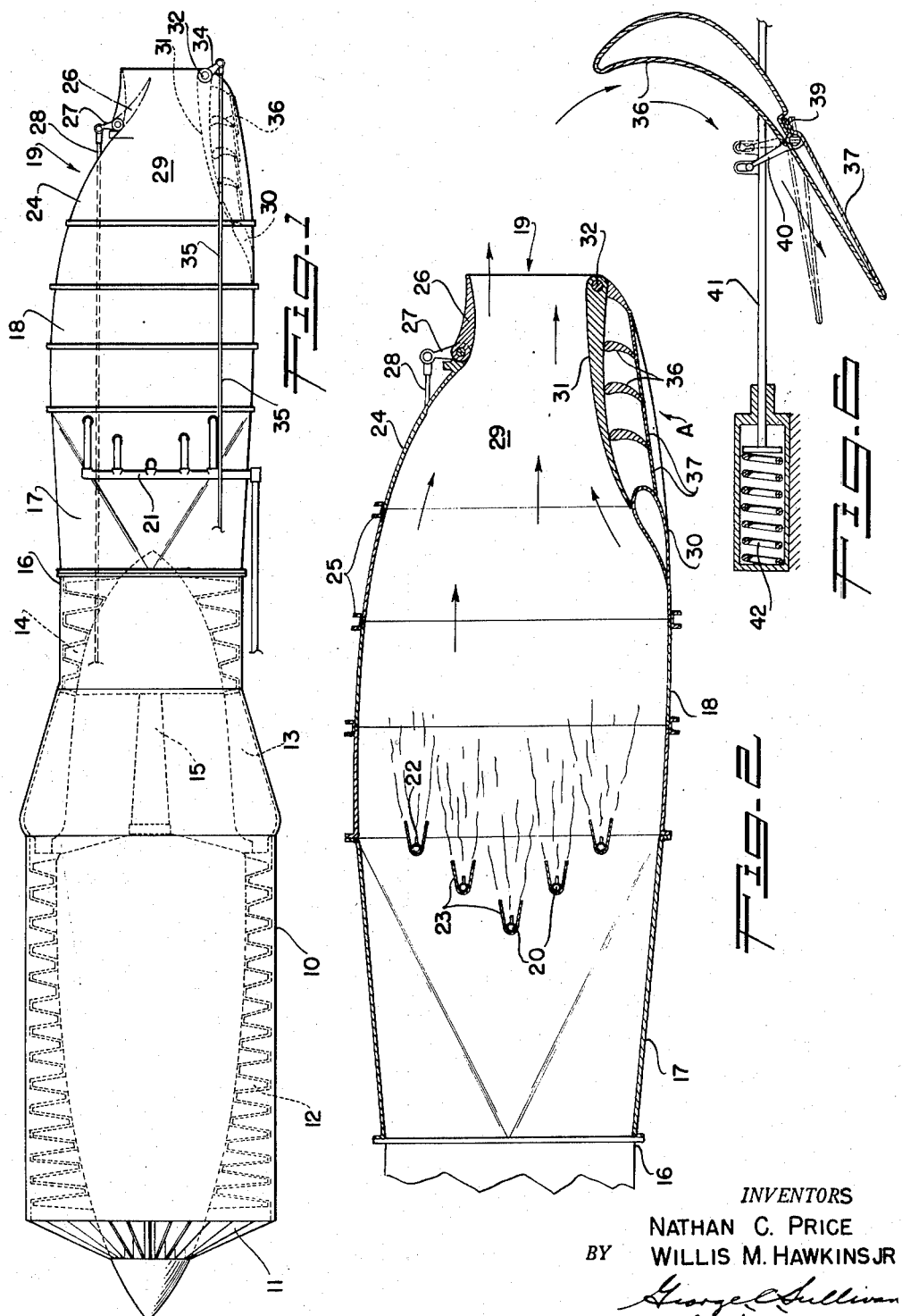

*INVENTORS*
NATHAN C. PRICE
BY WILLIS M. HAWKINS JR.

2,802,333

VARIABLE AREA AND DIRECTION CHANGING PROPULSIVE NOZZLE

Nathan C. Price, Hollywood, and Willis M. Hawkins, Jr., North Hollywood, Calif., assignors to Lockheed Aircraft Corporation, Burbank, Calif.

Application December 28, 1951, Serial No. 263,756

4 Claims. (Cl. 60—35.54)

This invention relates to the propulsion of vehicles and relates more particularly to the reactive propulsion and braking of high-speed vehicles, such as aircraft. It is a general object of the invention to provide a simple, practical and effective variable area and variable direction reactive propulsion nozzle means for aircraft, and the like.

The reactive propulsion type of powerplant, such as an internal combustion turbo-jet engine, is provided with a nozzle to eject the products of combustion and compressed air in the form of a high velocity jet to obtain the reactive propulsion effect or thrust. In order to obtain increased or augmented thrust during take-off, for tactical maneuvers, etc. it has become the practice in some cases to burn supplemental fuel in the gas stream at a region between the outlet of the turbine and the nozzle, this practice being known as re-heating or after-burning. The result of this afterburning is to increase the temperature of the gases and increase the volumetric flow through the nozzle. This, in turn, makes it desirable or mandatory to increase the effective cross sectional area of the nozzle during the re-heat or afterburning operations.

Where an airplane of substantial size and weight is propelled by reactive jet powerplants, it is important that suitable provisions be made to rapidly decelerate or brake its forward speed preparatory to landing the craft to adapt it to land on the present-day fields of practical length. The jet powerplants themselves of course can not be reversed to obtain the braking action and aerodynamic flaps, etc. are often incapable of providing the necessary deceleration. Another problem that is present in designing a multi-engined jet propelled airplane is the installation of the engines in such a manner that they do not spoil the aerodynamic contours of the airplane or create excessive drag.

Another object of the present invention is to provide reactive jet producing nozzle means for aircraft, and the like, wherein the cross sectional area of the nozzle may be readily increased for afterburning or re-heat operations, wherein the direction of the discharging propulsive jet may be changed or reversed to obtain a braking action and wherein the configuration of the nozzle means and tail pipe regions are such that a plurality of the engines may be installed in side-by-side relation to offer a minimum of aerodynamic drag and to be readily faired into the airplane structure.

Another object of the invention is to provide nozzle means of the character referred to in which the aft portion from which the jet discharges is substantially rectangular in configuration with its major transverse dimension extending spanwise and is equipped with a single movable gate adapted to be moved between a normal position where it restricts the nozzle for normal flight operations and an open position where the area of the nozzle is appreciably increased for augmented thrust during afterburning operations. The substantially rectangular nozzle not only adapts the engines for installation in compact side-by-side relation but also makes it practical to employ a single movable closure or gate at each nozzle for varying the cross sectional area of the outlet. In the past, it has been the common practice to utilize the so-called "clam-shell" nozzles requiring at least two hinged members engaged about the exterior of the round or cylindrical nozzle where they complicate the installation of the engine and offer substantial aerodynamic drag and resistance to the discharge of the propulsive gas stream.

Another and important object of the invention is to provide nozzle means of this character wherein the means for changing the direction of the jet comprises a simple series or cascade of stationary turning vanes operable to direct the jet forwardly and laterally or in an oblique direction to obtain the braking effect and a direction changing valve or gate that normally forms a wall of the nozzle throat where it covers the turning vanes and that is movable to a position where it extends across the end of the nozzle to divert or direct the gas stream laterally through the turning vanes for forward direction thereby. This stream directing gate is shaped and arrranged to constitute a smooth faired-in throat wall in the nozzle so long as the jet is directed aft and to form a smooth curving surface for directing or diverting the gas stream laterally with a minimum of loss when the jet is directed laterally and forwardly to brake the forward flight. The structure is such that only one movable and readily operated part is required to change the direction of the discharging propulsive jet.

A further object of the invention is to provide a direction changing nozzle of the character described wherein the turning vanes for directing the gas stream forwardly or in the oblique direction are equipped with tails or flaps that extend between the adjacent vanes to close the spaces therebetween and to form a smooth fairing over the vanes so that the latter do not offer or create aerodynamic drag.

A still further object of the invention is to provide a direction changing propulsive nozzle of this character that is adapted for use on jet powerplants employed in aircraft designed to rise substantially vertically during take-off then assume a normal flight course and that may descend substantially vertically during landing, the nozzle being adapted to change the direction of discharge of the propulsive jet for these several maneuvers.

Still another object of the invention is to provide a propulsive nozzle of the kind mentioned wherein the losses attributable to changing the direction of the gas stream are at a minimum. The main direction changing valve or gate is in the region of approach to the nozzle exit where the velocity of the gas stream is relatively low and the losses accompanying the turning of the stream at this region are consequently low. The cascade of turning vanes provides for the abrupt turning of the gas stream and the vanes are shaped and related to leave or define a nozzle exit which comprises a plurality of exit passages in which the cross sectional areas decrease rapidly toward the exit so that the velocity of the gas increases rapidly with an accompanying decrease in pressure at the regions of the abrupt turn so that the tendency for separation is greatly reduced.

Other objectives and features of the invention will become apparent from the following detailed description of a typical preferred embodiment wherein:

Figure 1 is a side elevation of a typical turbojet powerplant provided with the nozzle arrangement of the invention with broken lines indicating the normal positions of the nozzle gate or valve members;

Figure 2 is an enlarged vertical detailed sectional view of the tail pipe and nozzle means showing the valve or gate members in position for afterburning;

Figure 3 is an enlarged side elevation of the nozzle means with the rear portion broken away to appear in vertical cross section and illustrating the action of the nozzle valve and vanes in directing the gas stream obliquely forward;

Figure 4 is an enlarged side elevation of the nozzle means with a portion broken away to illustrate the main direction changing valve or member in plan elevation;

Figure 5 is an enlarged vertical detailed sectional view of the turning vanes and their tails in the operative positions; and Figure 6 is an enlarged fragmentary sectional view illustrating the spring means for holding the vane tails in the retracted positions.

In the drawings we have shown the nozzle arrangement of the invention associated with a more or less typical turbo-jet powerplant of the class employed for the propulsion of aircraft. The powerplant includes an elongate casing 10 having a ram inlet 11 at its forward end for the reception of rammed air. The forward portion of the casing 10 is occupied by a compressor 12 which may be of the axial flow type and a combustor or combustion chamber 13 receives the compressed air from the compressor. The combustion chamber 13 in turn discharges the heated compressed air and products of combustion into a turbine 14 in the aft portion of the casing 10 to drive the turbine. The turbine 14 in turn drives the compressor 12 through a suitable shaft arrangement 15. In accordance with the usual practice the outlet 16 of the turbine 14, that is the aft end of the casing 10, may be round or cylindrical.

The invention provides a rearwardly extending tubular continuation or tail pipe for the engine casing 10 comprised of three regions or sections, namely a diffuser 17, a combustion chamber portion 18 and a nozzle 19. The forward end of the diffuser 17 is preferably round or cylindrical to conform to the aft end of the turbine 14 and is secured to the rear end of the engine casing 10 by a flange and bolt connection, or the equivalent. While the forward end of the diffuser 17 is cylindrical, the aft end is rectangular, the cross sectional shape of the diffuser gradually changing from that of a hollow cylinder to that of a hollow rectangle. Also, the fluid capacity or cross sectional area of the diffuser 17 increases rearwardly. The combustion chamber portion 18 of the tail pipe is rectangular in cross section and continues rearwardly from the diffuser 17. The combustion chamber portion 18 may be substantially uniform in fluid capacity and is equipped with means for injecting the supplemental fuel for the afterburning operations. This means may comprise a plurality of fuel pipes 20 extending transversely or horizontally through the combustion chamber 18 from an external supply manifold 21 and provided with spaced rearwardly projecting jets or nozzles 22. Rearwardly flared trough-like shields or flame-holders 23 are associated with the fuel pipes 20 to project rearwardly beyond the fuel nozzles 22 to prevent the flames from blowing out and to serve as flame-holders to prevent the flame from advancing forwardly in the combustion chamber.

The nozzle 19 continues rearwardly from the combustion chamber portion 18 and is gradually reduced or restricted in cross sectional area. As illustrated in the drawings the aft end of the diffuser 17, the combustion chamber portion 18 and the nozzle 19, are rectangular in cross section and are elongated in the horizontal direction, that is their horizontal transverse dimension is greater than their vertical dimension. The vertical sides of the nozzle 19 may be substantially flat and vertical, while the upper wall 24 of the nozzle slopes or curves downwardly and rearwardly. The diffuser 17, the combustion chamber portion 18 and the nozzle 19 may each be constructed of one or more sections and are supported against bursting loads, etc. by a plurality of axially spaced rectangular frames 25. These frames 25 may be constructed of channel stock, or the like, and of sufficient depth and strength to adequately reinforce the tail pipe structure and may be employed to assist in mounting the engine and tail pipe in the airplane.

The nozzle 19 is provided with several unique and important features of the invention. A movable valve or gate 26 is provided on the nozzle 19 and is operable to control or vary its effective cross sectional area. We have shown the gate 26 hinged or pivoted at the rear edge of the curved upper nozzle wall 24 to extend rearwardly therefrom. The gate 26 extends horizontally between the flat opposite side walls 29 of the nozzle and its inner or lower surface is curved and convex to form a smooth continuation or extension of the curved upper wall 24 of the nozzle when the gate is in its normal or lower position with the engine operating without reheat or afterburning. In this lower position, which is illustrated in broken lines in Figure 1, the gate 26 serves to reduce the cross sectional area of the nozzle exit to most efficiently eject the air and gases in a high velocity propulsive jet. An operating lever 27 is attached to the valve or gate 26 and an operating rod 28, or the equivalent, extends forwardly from the lever at the exterior of the engine for operation by a manual lever, or the like, in the pilot's compartment, not shown. The rod 28 is adapted to operate or move the gate 26 between the position of Figure 1 where it restricts the nozzle exit to the position of Figure 2 where the gate is raised or moved outwardly to materially increase the cross sectional area of the nozzle exit for afterburning operations.

The lower side of the nozzle 19 is designed and constructed to provide an exit A for the discharge of the air and gas stream when it is desired to utilize the high velocity stream to afford a negative or forward thrust to brake the forward motion of the airplane. As best illustrated in Figures 2 and 3 of the drawings, a hollow, generally airfoil shaped member 30 is provided in the lower portion of the nozzle 19 to extend horizontally between its side walls 29. This member 30 presents an upwardly and rearwardly curved upper surface which serves as a portion of the lower wall or throat of the nozzle 19. The rear end of the member 30 is convex and curves rearwardly and downwardly and then downwardly and forwardly to form the forward wall of the above mentioned lateral supplemental nozzle exit A. The lower portion of the nozzle 19 is equipped with a direction changing gate or valve 31 for diverting the gas stream through the exit A. This valve 31 extends between the opposite sides 29 of the rectangular nozzle 19 and when in the positions of Figures 1 and 2 extends between the aft extremity of the nozzle and the member 30. The rear end of the valve 31 is fixed to a horizontal rod or shaft 32 which, in turn, is supported in appropriate bearings 33 on the sides 29 of the nozzle 19. The turnable shaft 32 supports the valve 31 for movement between the position of Figures 1 and 2 and the position of Figure 3 where it closes off the aft end of the nozzle 19. Considering the valve 31 to be in the position of Figure 2, it will be seen that its upper surface is convex and gradually curved to form the lower wall of the rearwardly restricted nozzle 19. When in this position the forward end of the valve 31 rests or bears on the upper side of the member 30 and the member 30 and the valve 31 together constitute a smooth curved throat restriction for the nozzle. Referring now to Figure 3, it will be observed that the upper portion of the valve 31 rests or bears against the curved upper wall 24 of the nozzle 19 to close off the aft end of the nozzle. The valve 31 is shaped so that when in this position it constitutes a downwardly and rearwardly curved and slightly concave continuation of the nozzle wall 24 to divert or direct the stream of air and gases downwardly to the lateral exit A, as indicated by the arrows in Figure 3. It is to be observed that the valve 31 effects this somewhat gradual change in direction of the gas stream in an approach region where the velocity of the stream is not appreciably increased and, therefore, there is only a slight loss accompanying this change in direction of the stream. A lever 34 is secured to the valve shaft 32 and an operating rod 35, or the equivalent, is connected with the lever to extend forwardly to an operating lever, or the like, in the pilot's compartment, not shown, to effect movement of the valve 31 between the two positions just described.

A plurality or cascade of turning vanes 36 is provided in the lateral nozzle exit A. These vanes 36 are stationary and preferably extend between the opposite sides of the nozzle 19. The vanes 36 are spaced axially or forward and aft in the exit A and are shaped in transverse cross section to resemble reaction type turbine blades. The trailing ends or portions of the vanes 36 are pitched or sloped downwardly and forwardly at a substantial angle. It is preferred to make the vanes 36 hollow, as shown in Figure 5, to increase their rigidity. The vanes 36 may, of course, be set or pitched at any selected angle. In a selected case they may be arranged to direct the stream of gas forwardly at an angle of about 30 degrees with respect to the central fore and aft axis of the powerplant. The vanes 36 are in the region of abrupt turning of the gas stream, themselves serving to effect such turning and are designed to, together with the walls of the exit A, rapidly decrease the cross sectional area of the gas stream. As a consequence, the vanes 36 turn or change the direction of the gases most efficiently and with a minimum or loss, the tendency for separation being greatly reduced.

In accordance with the invention the turning vanes 36 are provided with folding or pivoted tails 37 for closing the outer side of the exit A when the valve 31 is in the position of Figure 2. These tails 37 are pivoted on the trailing edges of the vanes 36 to be movable between the closed positions of Figure 2 and the open positions of Figure 3. Lugs 39 on the tails 37 engage against the vanes 36 to stop the tails in the open positions where they extend downwardly and forwardly at the preferred angle. It will be observed that the tails 37 assist in directing the gas stream forwardly to obtain the negative or reverse thrust. Means is preferably provided to urge the tails 37 to their closed positions. This may comprise levers 40 on the tails pivotally connected with a rod 41 which, in turn, is acted upon by a spring 42 to urge the several tails to the closed position of Figure 2. It will be observed that when in this position the outer extremities of the tails 37 engage against the adjacent vanes 36 and the forward tail engages the member 30 so that the series of tails forms a substantially smooth flat fairing which minimizes the aerodynamic drag at the exit A.

During normal operation, that is during non-afterburning operation when the usual forward thrust is desired, the parts are in the positions illustrated in Figure 1 of the drawings where the gate 26 is in its active or lower position and the valve 31 closes the exit A, these parts assisting in defining the rearwardly directed exit of the propulsive nozzle 19. For afterburning operations when added forward thrust is desired, the gate 26 is operated or raised to the position of Figure 2 to increase the cross sectional area of the nozzle 19 and thus accommodate the added volumetric flow resulting from the reheating of the gases in the combustion chamber 18. During such operations fuel is, of course, injected into the gas stream from the afterburner nozzles 22. Throughout both of the above described operations the tails 37 of the vanes 36 are in their closed positions, as illustrated in Figure 2, where they constitute a shield or fairing across the cascade of vanes. When a reverse or negative thrust is desired, for example when landing the airplane, the valve 31 is operated or raised to the position of Figure 3. When the valve 31 is in this position the stream of gases is directed downwardly or laterally, as indicated by the arrows in Figure 3, to discharge through the exit A. It will be observed that the gate 26 tends to direct the jet to produce a greater lift so that the flight controls of the airplane require less readjustment upon directing the jet forwardly through the exit A as just described. Further, the gate 26 is usually in the lowered active position when afterburning is not employed and serves to increase the velocity of the jet stream so that the pressure differential across the valve 31 is reduced when the same is moved to the position of Figure 3, thus reducing the force required to move the valve. The high velocity jet swings the tails 37 to their open positions where they, in effect, form continuations of the turning vanes as above described. The vanes 36 and their tails 37 direct the propulsive jet forwardly and laterally or downwardly to provide a substantial negative or reverse thrust that is effective in braking or retarding the forward motion of the airplane.

Having described only a typical form of the invention we do not wish to be limited to the specific details herein set forth, but wish to reserve to ourselves any variations or modifications that may appear to those skilled in the art and fall within the scope of the following claims.

We claim:

1. In a reactive propulsion powerplant for producing a stream of gases the combination of a tail pipe receiving said stream and having a nozzle at its rear end for discharging said stream in the form of a propulsion jet and having a lateral exit adjacent the nozzle, turning vanes in the lateral exit operable to direct the stream forwardly to produce a reverse thrust, said vanes being spaced to leave spaced passages, tails pivoted on the vanes for closing said passages and movable outwardly by the gas stream to leave the passages open for the discharge of the gases therethrough, and a valve member in the tail pipe movable between a position where it lies substantially flush with the wall of the tail pipe to close the lateral exit and where it leaves the nozzle open to cause the stream to discharge from the nozzle and a position where it extended across the interior of the pipe at the aft end of the lateral exit to close the nozzle and leave the exit open for the discharge of the stream therethrough.

2. In a reactive propulsion powerplant for producing a stream of gases the combination of a tail pipe receiving said stream and having a nozzle at its rear end for discharging said stream in the form of a propulsive jet and having a lateral exit adjacent the nozzle, turning vanes in the lateral exit operable to direct the stream forwardly to produce a reverse thrust, said vanes being spaced apart to leave passages and having outer ends adjacent the exterior of the tail pipe, tails pivoted on the outer ends of the vanes, spring means for holding the tails in closed positions where they constitute a fairing across the vanes substantially flush with the exterior of the tail pipe and yieldable to allow the tails to swing outwardly where they project from the pipe to form gas directing extensions of the turning vanes, and a valve member in the tail pipe movable between a position where it closes the lateral exit and leaves the nozzle open to cause the stream to discharge from the nozzle and a position where it closes the nozzle and leaves the exit open for the discharge of the stream therethrough.

3. Tail pipe and nozzle means for use on a gas turbine engine having an outlet for discharging a stream of combustion gases, said means comprising a tail pipe extending aft from the outlet to conduct the stream therefrom, the tail pipe including a rearwardly flaring diffuser receiving the stream from said outlet, a combustion chamber portion aft of the diffuser and a nozzle aft of the combustion chamber portion, said nozzle having wall portions converging rearwardly to define a rearwardly directed nozzle exit and having a laterally facing exit adjacent said nozzle exit, means for injecting fuel into said chamber to heat said stream, a valve in the nozzle movable between a first position where it closes said lateral exit and leaves the nozzle exit open and a second position where it closes the nozzle exit and leaves said lateral exit open, a gate in the nozzle movable between a position where it restricts the nozzle exit and a position where it leaves the nozzle exit unrestricted, a plurality of airfoil shaped vanes in said lateral exit for directing said stream forwardly when the valve is in said second position, and means for covering the vanes and for closing the outer end of said lateral exit when the valve is in said first position including spring loaded tails on the vanes normally closing the spaces between the vanes and forced outwardly by the gas stream to form continuations of the vanes.

4. In a reactive propulsion powerplant for producing a stream of gases the combination of; a tail pipe receiving said stream, the tail pipe having a nozzle exit at its rear end for discharging the stream rearwardly and having a laterally directed opening adjacent the nozzle exit, valve means in the tail pipe operable between a first position where it closes said opening and leaves the exit open and a second position where it closes the exit and leaves the laterally directed opening open, means for operating the valve means between said two positions, a plurality of turning vanes in said opening spaced one from the other to leave a plurality of spaced passages, the vanes having trailing end portions pitched forwardly to direct said stream forwardly to produce a reverse thrust when the valve means is in said second position, tails pivoted on the vanes to extend forwardly beyond said end portions when the valve means is in said second position, and means for moving the tails to positions where they close the exit ends of said passages and constitute a fairing for the outer ends of the vanes when the valve means is in said first position.

References Cited in the file of this patent

UNITED STATES PATENTS

| | | |
|---|---|---|
| 141,039 | Dow | July 22, 1873 |
| 340,237 | Nagel et al. | Apr. 20, 1886 |
| 1,773,225 | Hall | Aug. 19, 1930 |
| 2,342,262 | Franz et al. | Feb. 22, 1944 |
| 2,418,488 | Thompson | Apr. 8, 1947 |
| 2,488,174 | Clegern | Nov. 15, 1949 |
| 2,515,074 | Bobier | July 11, 1950 |
| 2,567,490 | Ljungström | Sept. 11, 1951 |
| 2,579,043 | Kallal | Dec. 18, 1951 |
| 2,603,060 | Brown | July 15, 1952 |
| 2,620,622 | Lundberg | Dec. 9, 1952 |
| 2,639,578 | Pouchot | May 26, 1953 |
| 2,681,548 | Kappus | June 22, 1954 |

FOREIGN PATENTS

| | | |
|---|---|---|
| 580,995 | Great Britain | Sept. 26, 1946 |
| 600,075 | Great Britain | Mar. 31, 1948 |
| (Corresponding U. S., 2,637,164, May 5, 1953) | | |
| 613,989 | Great Britain | Dec. 8, 1948 |